United States Patent Office 3,707,548
Patented Dec. 26, 1972

3,707,548
9-HYDROXY-15-OXO-PROSTANOIC ACID
Jehan F. Bagli, Valois Gardens, Quebec, and Tibor Bogri, Montreal, Quebec, Canada, assignors to Ayerst, McKenna & Harrison, Limited, Ville St. Laurent, Quebec, Canada
No Drawing. Continuation-in-part of application Ser. No. 769,750, Oct. 22, 1968. This application July 28, 1969, Ser. No. 845,532
Int. Cl. C07c *61/36, 69/74*
U.S. Cl. 260—468 D
5 Claims

ABSTRACT OF THE DISCLOSURE

There are disclosed herein 9,15-dioxoprostanoic acid, 9-hydroxy-15-oxoprostanoic acid, 9,15-dihydroxyprostanoic and 9-oxo-15-hydroxy-prostanoic acid, lower alkyl esters thereof, and homologs thereof, as well as a process for preparing the above acids, lower alkyl esters thereof, and homologs thereof. The compounds possess hypotensive, antihypertensive, bronchospasmolytic and gastric acid secretion inhibiting properties, as well as inhibiting the aggregation of platelets and promoting the disaggregation of aggregated platelets. Methods for their use are also disclosed.

This application is a continuation-in-part of our application S.N. 769,750, filed Oct. 22, 1968, now abandoned.

BACKGROUND OF INVENTION

This invention relates to 9,15-dioxoprostanoic acid, 9-hydroxy-15-oxoprostanoic acid, 9,15-dihydroxyprostanoic and 9-oxo-15-hydroxyprostanoic acid to lower alkyl esters thereof, to homologs thereof, and to intermediates used in the preparation of the above compounds, as well as to a process for preparing said intermediates and the above acids, lower alkyl esters thereof, and homologs thereof.

The compounds of this invention are structurally related to the natural prostaglandins which are more fully described in their biological activities and chemical structures in the Proceedings of the Second Nobel Symposium, Stockholm, June 1966, and in the review paper by U. Axen published in Annual Reports in Medicinal Chemistry, Academic Press, p. 290, New York and London, 1968. The prostaglandins occur in nature only in very small quantities, and the processes for their extraction and purification from natural sources are laborious and inefficient. It is an object of this invention to provide compounds structurally related to the naturally occurring prostaglandins by synthetic means.

The compounds of this invention have been found to possess interesting pharmacological properties when tested in standard pharmacological tests. In particular, they have been found to possess hypotensive, antihypertensive, bronchospasmolytic, and gastric acid secretion inhibiting properties, which make them useful in the treatment of conditions associated with high blood pressure, in the treatment of asthmatic conditions and in the treatment of pathological conditions associated with excessive secretion of gastric acid such as, for example peptic ulcer. In addition, the compounds of this invention inhibit the aggregation of platelets and promote the disaggregation of aggregated platelets, and are useful as agents for the prevention and treatment of thrombosis.

SUMMARY OF THE INVENTION

The compounds of this invention may be represented by the Formula I

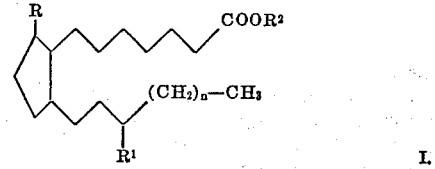

in which R and $R^1$ are the same or different and represent H(OH) or O(ketonic oxygen), $R^2$ represents hydrogen or a lower alkyl group of from 1 to 3 carbon atoms, and $n$ represents an integer of from 1 to 6. The process of this invention is exemplified in the flow sheet shown below, in which $R^2$ and $n$ have the same significance as defined above, and $R^3$ represents hydrogen or a protective group such as, an acyl group such as, for example, the acetyl or carbobenzoyloxy group, or an ether-forming group such as, for example, the benzyl or the tetrahydropyranyl group.

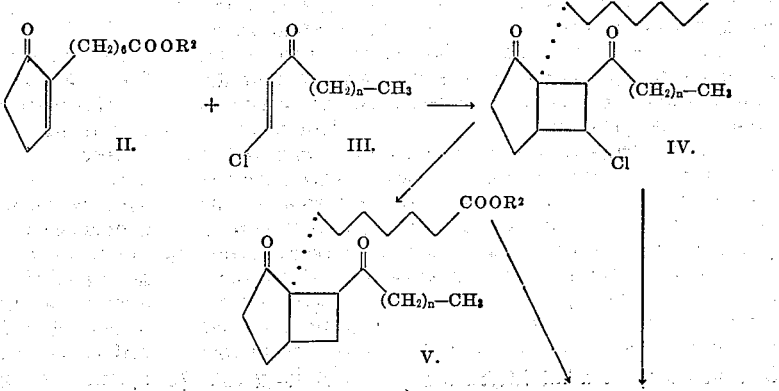

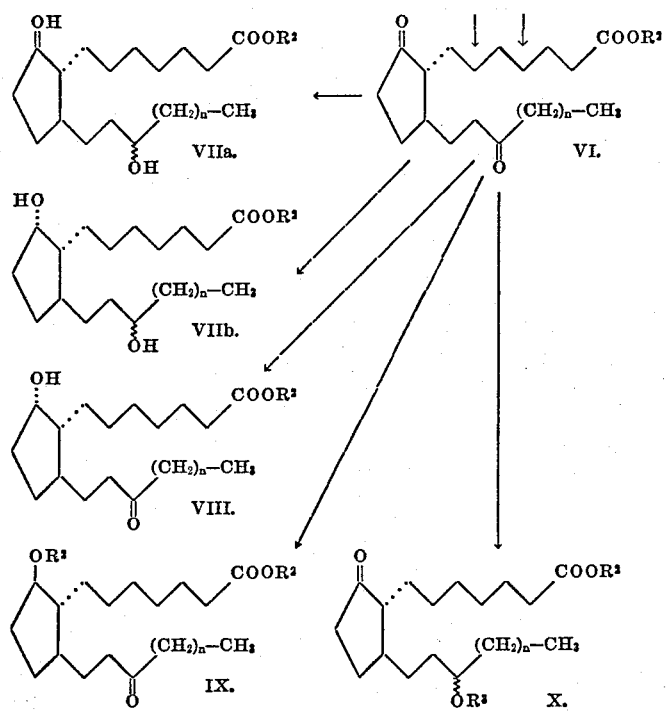

The compounds prepared by the process of this invention have been found to possess the interesting pharmacological properties enumerated above. More particularly, these compounds, when tested in a modification of the tests for determining hypotensive activities described in "Screening Methods in Pharmacology," Academic Press, New York and London, 1965, page 146, using the cat in urethane-chloralose anaesthesia as the test animal and measuring mean arterial blood pressure before and after intravenous administration of the compounds, have exhibited utility as hypotensive agents. When tested in the renal hypertensive rat prepared by the method of A. Grollman described in Proc. Soc. Exp. Biol. Med., vol. 7, p. 102 (1954), and measuring blood pressure by the method described by H. Kersten in J. Lab. Clin. Med., vol. 32, p. 1090 (1947), they have exhibited utility as antihypertensive agents.

Moreover, the compounds of this invention, when tested in a modification of the test method described by Armitage et al. in Brit. J. Pharmacol., vol. 16, p. 59 (1961), have been found to alleviate bronchospasms, and are useful as bronchospasmolytic agents.

Furthermore, the compounds of this invention, when administered to rats in the test method described by Shay et al. in Gastroenterology, vol. 26, p. 906 (1954), have been found to inhibit the secretion of gastric acid, and are useful as agents inhibiting the secretion of gastric acid.

In addition, the compounds of this invention, when tested in a modification of the test method described by G. V. R. Born in Nature, vol. 194, p. 927 (1962), using the aggregometer manufactured by Bryston Manufacturing Limited, Rexdale, Ontario, Canada, have been shown to inhibit the aggregation of platelets and to promote the disaggregation of aggregated platelets, and are useful as agents for the prevention and treatment of thrombosis.

When the compounds of this invention are employed as hypotensive or anti-hypertensive agents, as agents inhibiting gastric acid secretion in warm-blooded animals, for example, in cats or rats, as agents for the prevention or treatment of thrombosis, or as bronchospasmolytic agents, alone or in combination with pharmacologically acceptable carriers, their proportions are determined by their solubilities, by the chosen route of administration, and by standard biological practice. The compounds of this invention may be administered orally in solid form containing such excipients as starch, lactose, sucrose, certain types of clay, and flavouring and coating agents. However, they are preferably administered parenterally in the form of sterile solutions thereof which may also contain other solutes, for example, sufficient sodium chloride or glucose to make the solution isotonic. For use as bronchospasmolytic agents, the compounds of this invention are preferably administered as aerosols.

The dosages of the present hypotensive, antihypertensive, gastric acid secretion inhibiting, or bronchospasmolytic agents, or agents for the prevention and treatment of thrombosis will vary with the forms of administration and the particular hosts under treatment. Generally, treatments are initiated with small dosages substantially less than the optimum doses of the compounds. Thereafter, the dosages are increased by small increments until the optimum effects under the circumstances are reached. In general, the compounds of this invention are most desirably administered at a concentration level that will generally afford effective results without causing any harmful or deleterious side effects and preferably at a level that is in a range of from about 0.1 mg. to about 10.0 mg. per kilo, although as aforementioned variations will occur. However, a dosage level that is in range of from about 0.5 mg. to about 5 mg. per kilo is most desirably employed in order to achieve effective results. When administering the compounds of this invention as aerosols the liquid to be nebulized contains preferably from 0.005–0.05 percent of the active ingredient.

DETAILED DESCRIPTION OF THE INVENTION

Our preferred starting material for the preparation of 9,15 - dioxoprostanoic acid is 2 - (6 - carbomethoxyhexyl)-cyclopent-2-en-1-one. The preparation of the corresponding 2-(6-carboxyhexyl)cyclopent-2-en-1-one is described in our U.S. patent application S.N. 485,935, filed Sept. 8, 1965, now Pat. No. 3,432,541. In accordance with the method described therein, the latter compound is obtained by condensing the known compound ethyl 7-bromo-1-heptanoate with the equally known potassium salt of ethyl cyclopentanone carboxylate, by refluxing a mixture of the two compounds in an inert solvent, to obtain ethyl 2-(6-carbethoxyhexyl)-cyclopentan-1-one-2-carboxylate; treating the latter compound with elementary bromine in chloroform solution to obtain ethyl 2-(6- carbethoxyhexyl) - 5 - bromocyclopentan - 1 - one-2-carboxylate; treating the latter compound with a mineral acid, preferably 20% sulfuric acid, to obtain 2-(6-carboxyhexyl)-cyclopent-2-en-1-one; and treating the latter compound with methanol and p-toluenesulfuric acid to obtain 2 - (6 - carbomethoxyhexyl)-cyclopent-2-en-1-one [I, R=R¹=O (ketonic oxygen), R²=H, n=4], the lower alkyl esters of the above acids, such as the ethyl or propyl esters, may also be used.

In a preferred procedure for the preparation of 9,15-dioxoprostanoic acid and of its derivatives, the last-named compound of Formula II is reacted with a vinyl ketone of the Formula III containing from 5 to 10 carbon atoms. If it is desired to prepare 9,15-dioxoprostanoic acid [I, R=R¹=O (ketonic oxygen), R²=H, n=4], the starting material is 1-chloro-3-oxo-oct-1-ene, prepared according to the general procedure described in Organic Syntheses, vol. 32, p. 27 (1952). The reaction is preferably carried out in the absence of a solvent, by irradiation with a 550 w. mercury vapour lamp with Pyrex filter and water cooling at 20–40° C. for 24 to 48 hours. Evaporation under reduced pressure followed by purification, for example by chromatography, yields 7-hexanoyl - 6 - chloro - 2 - oxobicyclo[3,2,0]heptane-1-heptanoic acid methyl ester (IV, $R^2=CH_3$, $n=4$). The latter compound, upon treatment with approximately 20 parts of zinc and acetic acid at temperatures between 60° C. and the boiling point of the mixture of several hours, preferably overnight yields a mixture of 7-hexanoyl-2-oxobicyclo-[3,2,0]-heptane-1-heptanoic acid methyl ester (V, $R^2=CH_3$, $n=4$) and 9,15-dioxoprostanoic acid methyl ester (VI, $R^2=CH_3$, $n=4$) which is separated, preferably by chromatography. Using approximately 30 parts of zinc per part of compound IV it is possible to obtain predominantly the compound of Formula VI. However, it is also possible to convert the compound of Formula V to that of Formula VI by an additional treatment with zinc and acetic acid.

The 9,15-dioxoprostanoic acid methyl ester (VI, $R^2=CH_3$) thus obtained may be subjected to alkaline hydrolysis to yield the corresponding prostanoic acid (VI, $R^2=H$, $n=4$).

Alternatively, 9,15-dioxoprostanoic acid methyl ester (VI, $R^2=CH_3$, $n=4$) is reduced with sodium borohydride to give a mixture of stereoisomeric alcohols, 9β,15ξ-dihydroxyprostanoic acid methyl ester (VIIa, $R^2=CH_3$, $n=4$) and 9α,15ξ-dihydroxyprostanoic acid methyl ester (VIIb, $R^2=CH_3$, $n=4$). Alkaline hydrolysis of the last-named compounds yields the corresponding 9β,15ξ- and 9α,15ξ-dihydroxyprostanoic acids of Formulae VIIa and VIIb, respectively ($R^2=H$, $n=4$).

In the same manner as described above, but using as the chlorovinyl ketones, chlorovinyl methyl, ethyl, propyl, butyl, or hexyl ketones, and proceeding as above, there are obtained the compounds of Formula IV ($R^2$=lower alkyl, and $n=1, 2, 3, 5$ or $6$), viz, 7-acetyl-, 7-propionyl-, 7-butanoyl-, 7-pentanoyl-, 7-heptanoyl-, and 7-octanoyl-6 - chloro - 2-oxobicyclo-[3,2,0]-heptane-1-heptanoic acid lower alkyl esters, respectively.

The latter compounds are converted by treatment with zinc and acetic acid in the same manner as described above to mixtures of the corresponding compounds of Formula V ($R^2$=lower alkyl, $n=1, 2, 3, 5$, or $6$) viz, 7-acetyl-, 7-propionyl-, 7-butanoyl-, 7-pentanoyl-, 7-heptanoyl-, or 7-octanoyl - 2 - oxobicyclo-[3,2,0]-heptane-1-heptanoic acid lower alkyl esters with the respectively corresponding compounds of Formula VI ($R^2$=lower alkyl, $n=1, 2, 3, 5$, or $6$) viz, the trans-lower alkyl esters of 2-(6-carboxyhexyl)-3-oxobutyl-, 3-oxopentyl-, 3-oxohexyl-, 3-oxoheptyl-, or 3-oxononyl-, or 3-oxodecyl-cyclopentan-1-one. The last-named compounds may be reduced in the same manner as described above to yield the corresponding compounds of Formulae VIIa and VIIb ($R^2$=lower alkyl, $n=1, 2, 3, 5$, or $6$) viz, trans-2-(6-carboxyhexyl)-3-(3ξ-hydroxybutyl)-, (3ξ - hydroxypentyl)-, (3ξ - hydroxyhexyl)-, (3ξ - hydroxyheptyl-, (3ξ-hydroxynonyl)- or (3ξ-hydroxydecyl)-cyclopentan-1α- and 1β-ol, respectively.

As another alternative, the compounds of Formula VI in which $R^2$ is as defined in the first instance, and preferably those in which $R^2$ represents a lower alkyl group, may be treated with an alkali metal borohydride, in solution in a di-(lower alkoxy)-ethane at low temperatures, preferably with sodium borohydride in dimethoxyethane at a temperature within the range of from −30° C. to −60° C. for periods of time of from 0.5–1.5 hours; preferably for 1 hour to yield the corresponding compounds of Formula VIII in which $R^2$ represents a lower alkyl group and $n$ is as defined above, and a mixture of the corresponding compounds of Formulae IX and X in which $R^2$ represents a lower alkyl group, $R^3$ represents hydrogen, and $n$ is as defined above. Said mixture of compounds of Formulae IX and X is treated with an agent capable of introducing a protective group on the free hydroxyl, such as, an esterifying or etherifying agent, preferably dihydropyran in the presence of a catalyst, preferably p-toluenesulfonic acid, in solution in a halogenated hydrocarbon, preferably chloroform, to yield a mixture of the corresponding tetrahydropyranyl ethers of Formulae IX and X in which $R^3$ represents the tetrahydropyranyl group and $n$ is as defined above. Separation of said last-named mixture is carried out by physical means, preferably by chromatography, and the protective group is removed by appropriate means. In the case of the above tetrahydropyranyl ethers, the tetrahydropyranyl group is removed by treatment with an acid, preferably a sulfonic acid ion exchange resin ("Dowex 50"), to yield the corresponding compounds of Formulae IX and X is which $R^3$ represents hydrogen, $R^2$ represents a lower alkyl group and $n$ is as defined above. Treatment of the above compounds of Formulae VIII, IX and X with a base, for example, an alkali metal hydroxide in solution in a lower alkanol, preferably sodium hydroxide in methanol, yields the corresponding compounds of Formulae VIII, IX and X in which $R^2$ and $R^3$ both represent hydrogen and $n$ is as defined above.

More specifically, when stirring the compounds of Formula VI in which $R^2$ represents the methyl group and $n$ is as defined in the first instance with sodium borohydride at −60° C. in solution in dimethoxyethane for one hour, diluting with ether, washing with saturated aqueous ammonium chloride solution and water, drying, evaporating the solvent, chromatographing on silica gel and eluting with ethyl acetate in benzene, there are obtained first the corresponding compounds of Formula VIII, viz, the methyl esters of trans-2-(6-carboxyhexyl)-3-oxobutyl-, -3-oxopentyl-, -3-oxohexyl-, -3-oxoheptyl-, -3-oxooctyl-, -3-oxononyl-, and -3-oxodecyl-cyclopentan-1α-ol; respectively. The methyl ester of trans-2-(6-carboxyhexyl)-3-oxooctyl-cyclopentan-1α-ol is also named 9α-hydroxy-15-oxo-prostanoic acid methyl ester.

Further, elution as above then yields a mixture of the corresponding methyl esters of Formulae IX and X in which $R^2$ represents the methyl group, $R^3$ represents hydrogen, and $n$ is as defined above. This mixture is stirred with dihydropyran and p-toluenesulfonic acid in solution in chloroform, preferably at room temperature, for periods of time of from 12–48 hours, preferably 18 hours. Filtration and removal of the solvent yields a mixture of the corresponding tetrahydropyranyl ethers of Formulae IX and X in which $R^2$ represents the methyl group, $R^3$ represents the tetrahydropyranyl group, and $n$ is as defined above. Said mixture is separated by chromatography on silica gel, and elution with ethyl acetate in benzene first yields the tetrahydropyranyl ether of Formula IX, viz, the methyl esters of trans-2-(6-carboxyhexyl)-3-oxobutyl-, -3-oxopentyl-, -3-oxohexyl-, -3-oxoheptyl-, -3-oxooctyl-, -3-oxononyl-, and -3-oxodecyl-1β-tetrahydropyranyloxy-cyclopentane, respectively. The methyl ester of trans-2-(6-carboxyhexyl) - 3 - oxooctyl-1β-tetrahydropyranyloxycyclopentane is also named the tetrahydropyranyl ether of 9β-hydroxy-15-oxoprostanoic acid methyl ester.

Continued elution as above yields the corresponding tetrahydropyranyl ethers of Formula X, viz, the methyl esters of trans-2-(6-carboxyhexyl) - 3 - (3ξ-tetrahydropyranyloxybutyl), -3-(3ξ - tetrahydropyranyloxypentyl), -3-(3ξ-tetrahydropyranyloxyhexyl)-, -3 - (3ξ - tetrahydropyranyloxyheptyl)-, -3-(3ξ - tetrahydropyranyloxyoctyl)-, -3-(3ξ-tetrahydropyranyloxynonyl)- and -3-(3ξ - tetrahydropyranyloxydecyl)-cyclopentan-1-one, respectively. The methyl ester of trans-2-(6-carboxyhexyl)-3-(3ξ-tetrahydropyranyloxy)-cyclopentan-1-one is also named the tetrahydropyranyl ether of 9-oxo-15-hydroxyprostanoic acid methyl ester.

The above tetrahydropyranyl ethers of Formula IX or X are dissolved in a lower alkanol, preferably methanol, and stirred with a sulfonic acid ion exchange resin, preferably "Dowex 50," at temperatures of from 10–30° C., preferably at room temperature for periods of time of 12–48 hours, preferably for 18 hours. Filtration, removal of the solvent, taking up in ether, washing with water, drying, and evaporating the solvent yields the corresponding compounds of Formulae IX and X in which $R^2$ represents the methyl group, $R^3$ represents hydrogen, and $n$ is as defined above. Thus, when treating the above tetrahydropyranyl ethers of Formula IX in the manner described immediately above, there are obtained the methyl esters of trans-2-(6-carboxyhexyl)-3-oxobutyl-, -3-oxopentyl-, -3-oxohexyl-, -3-oxoheptyl, -3-oxooctyl-, -3-oxononyl-, and -3-oxodecyl-cyclopentan-1β-ol, respectively. Similarly, when treating the tetrahydropyranyl ethers of Formula X in the manner described immediately above, there are obtained the methyl esters of trans-2-(6-carboxyhexyl)-3-(3ξ-hydroxybutyl)-, -3-(3ξ - hydroxypentyl)-, -3-(3ξ-hydroxyhexyl)-, -3-(3ξ-hydroxyheptyl)-, -3-(3ξ-hydroxyoctyl)-, -3-(3ξ-hydroxynonyl)-, and -3-(ξ-hydroxydecyl)-cyclopentan-1-one, respectively.

Hydrolysis of the methyl ester group in the last-named compounds of Formulae VIII, IX, and X in which $R^2$ represents the methyl group, $R^3$ represents hydrogen, and $n$ is as defined above, is effected by stirring the compounds in solution in a lower alkanol, preferably methanol, with an aqueous solution of sodium hydroxide, at temperatures of from 10–30° C., preferably at room temperature, for periods of time of from 12–48 hours, preferably for 18 hours, evaporating the solvent, taking up the residue in water, acidifying, extracting with ether, drying and evaporating the solvent. In this manner there are obtained the free acids of Formulae VIII, IX, and X in which $R^2$ and $R^3$ represent hydrogen and $n$ is as defined above.

Thus, when treating the methyl esters of Formula VIII in the manner described immediately above, there are obtained trans-2-(6-carboxyhexyl)-3-oxobutyl-, -3 - oxopentyl-, -3-oxohexyl-, -3-oxoheptyl-, -3-oxooctyl-, -3-oxononyl-, and -3-oxodecyl - cyclopentan - 1α - ol, respectively. Trans-2-(6-carboxyhexyl)-3-oxooctyl-cyclopentan-1α-ol is also named 9α-hydroxy-15-oxoprostanoic acid.

When treating the methyl esters of Formula IX in the same manner, there are obtained trans-2-(6-carboxyhexyl)-3-oxobutyl-, -3-oxopentyl-, -3-oxohexyl-, -3-oxoheptyl-, -3-oxooctyl-, -3-oxononyl-, and -3-oxodecyl-cyclopentan-1β-ol, respectively. Trans-2-(6-carboxyhexyl)-3-oxooctyl-1β-ol is also named 9β-hydroxy-15-oxoprostanoic acid.

When treating the methyl esters of Formula X in the same manner there are obtained trans-2-(6-carboxyhexyl) - 3 - (3ξ - hydroxybutyl-, - 3 - (3ξ - hydroxypentyl-, -3-(3ξ-hydroxyhexyl)-, -3-(3ξ-hydroxyheptyl)-, - 3 - (3ξ-hydroxyoctyl)-, -3-(3ξ - hydroxynonyl)-, and -3-(3ξ - hydroxydecyl)-cyclopentan - 1 - one, respectively. Trans-2-(6-carboxyhexyl)-3-(3ξ - hydroxyoctyl) - cyclopentan - 1-one is also named 9-oxo-15ξ-hydroxyprostanoic acid.

The following examples will illustrate this invention.

EXAMPLE 1

7-hexanoyl-6-chloro-2-oxobicyclo-[3,2,0]-heptane-1-heptanoic acid methyl ester (IV)

A solution of 2-(6-carbomethoxyhexyl)-cyclopent-2-en-1-one (4.52 g.) in 1-chloro-3-oxooct-1-ene is irradiated with 550-watt mercury arc (with Pyrex filter) over a period of 28 hours, under nitrogen atmosphere. The reaction is stopped and the mixture is fractionally distilled to remove unchanged chlorovinyl ketone (B.P., 80–83° C./12 mm.), and cyclopentenone (bath temperature 170° C./1.5 mm.). The residue is chromatographed on a column of silica gel (180 g.) in benzene. Elution with 2% ether-benzene yields a product (1.6 g.). A rechromatography on silica gel yields the title compound as an oil which is homogenous by thin-layer and gas-liquid chromatography and is characterized by analysis, by N.M.R. spectrography δ4.50 (1H, quartet, on carbon bearing chlorine) δ3.17 (1H, α to ketone, on cyclobutane) δ3.65 (3H, methoxyl) δ0.88 (3H, terminal methyl) and by mass spectrography M–36: 348; M–(36+31): 317; M–(36+99): 249 m./c.

EXAMPLE 2

7-hexanoyl-2-oxobicyclo-[3,2,0]-heptane-1-heptanoic acid methyl ester (V)

A solution of 7-hexanoyl - 6 - chloro - 2 - oxobicyclo-[3,2,0]-heptane-1-heptanoic acid (0.454 g.) in glacial acetic acid (30 ml.) is refluxed with stirring overnight, in presence of zinc (2.76 g.). The mixture is filtered and the solvent removed. The residue is taken up in ether, washed with water, dried, and the solvent is removed, to yield an oily residue, a mixture of compounds III and IIIa, which is separated by chromatography as silica gel. The title compound is eluted with 5 percent ether/benzene and is obtained in the first fractions with $$\nu_{max.}^{CHCl_3}\ 1700,\ 1725\ cm.^{-1}$$

it is further characterized by mass spectrography (M: 350 m./c.; M–31; 319 m./c.; M–99: 251 m./c.; M–71: 271 m./c.; and by N.M.R. δ3.65 (3H, methoxyl); δ3.05 (1H, α to carbonyl on cyclobutane) δ0.88 (3H, terminal methyl).

EXAMPLE 3

9,15-dioxoprostanoic acid methyl ester (VI)

To a solution of 7-hexanoyl-6-chloro - 2 - oxobicyclo-[3,2,0]-heptane - 1 - heptanoic acid methyl ester (0.5 g.) in acetic acid (30 ml.) is added zinc dust (7.5 g.) and the mixture is stirred overnight, at reflux temperature, cooled, and filtered. The residue is washed with ether, and the solvent is completely removed. The residue is taken up in ether, washed with water, dried, and the solvent is removed. The residue is chromatographed on silica gel (23.6 g.) and the latter eluates with 5% ether/benzene yield the title compound as a homogenous product $$\nu_{max.}^{CHCl}\ 1726,\ 1708\ cm.^{-1}$$

Alternatively, the title compound may also be prepared as follows.

To a solution of 7-hexanoyl-2-oxobicyclo-[3,2,0]-heptane - 1 - heptanoic acid methyl ester (0.35 g.), obtained as described in Example 2, in acetic acid (25 ml.) zinc dust (10 g.) is added and the mixture is heated in an oil bath at 115° overnight. The reaction mixture is cooled and filtered. The solvent is removed and the residue taken up in ether, washed with water, dried and the solvent is removed to yield the title compound as an oil, identical with the compound as described above.

EXAMPLE 4

9α and 9β, -15ξ-dihydroxyprostanoic acid methyl ester (VIIa, VIIb)

To a solution of 9,15-dioxoprostanoic acid methyl ester (0.420 g.) in methanol (6 ml.) is added sodium borohydride (0.157 g.). The reaction mixture is stirred for 30 minutes and diluted with ether. The organic extract is washed with 2–3 ml. of 3% hydrochloric acid, followed by water and saline, dried, and the solvent is removed.

The residual oil is chromatographed on silica gel (Merck, 0.05 mm.–0.2 mm. 25 g.) in 40% ethyl acetate-benzene to yield the title compounds 9β,15ξ-dihydroxyprostanoic acid methyl ester and 9α,15ξ-dihydroxyprostanoic acid methyl ester characterized by $$\nu_{max.}^{film} \; 3400, \; 1725 \; cm.^{-1}$$

and by N.M.R. (CDCl$_3$) spectrography, where 9β,15-dihydroxyprostanoic acid methyl ester has δ3.94 (1H, ring carbinolic) δ3.71–3.52 (4H, 3 of methoxyl singlet, and 1 carbinolic) and 9α,15ξ-dihydroxyprostanoic acid methyl ester has δ4.29 (1H, ring carbinolic) δ3.72–3.52 (4H, 3 of methoxyl, 1 carbinolic).

9,15-dioxoprostanoic acid (VI, R=H)

EXAMPLE 5

To a solution of 9,15-dioxoprostanoic acid methyl ester (0.3 g.) in methanol (2 ml.) is added sodium hydroxide solution (0.5 ml., 10%) and the mixture is stirred overnight, under nitrogen atmosphere. The reaction mixture is diluted with ether, and washed with water. The aqueous layer is acidified and reextracted with ether, the ether layer is dried and the solvent is removed to yield 9,15-dioxoprostanoic acid,

EXAMPLE 6

$$\nu_{max.}^{film} \; 3200, \; 1728, \; 1700 \; cm.^{-1}$$

9α,15ξ-dihydroxyprostanoic acid (VIIa and VIIb)

To a solution of 9α,15ξ-dihydroxyprostanoic acid methyl ester (0.085 g.) in methanol (2 ml.) there is added 0.2 ml. of sodium hydroxide solution (10 percent) and the mixture is stirred overnight at room temperature. The reaction mixture is diluted with ether, to remove non-acidic material. The aqueous layer is acidified with 10 percent hydrochloric acid and extracted with ether. The ether layer is dried and the solvent is removed, to yield 9α,15ξ-dihydroxyprostanoic acid (VIIa, R=H), crystallized from acetone-hexane to M.P. 97–8° C.

$$\nu_{max.}^{film} \; 3375, \; 1700 \; cm.^{-1}$$

In a similar manner as described above 9β,15ξ-dihydroxyprostanoic acid methyl ester is hydrolyzed to the corresponding 9β,15-dihydroxyprostanoic acid which is obtained as an oil with $$\nu_{max.} \; 3378, \; 1700 \; cm.^{-1}$$

EXAMPLE 7

9α-hydroxy-15-oxoprostanoic acid methyl ester

A solution of 9,15-dioxoprostanoic acid methyl ester (3.0 g.) in 1,2-dimethoxyethane (18 ml.) is cooled to —50° C. and sodium borohydride (0.321 g.) is added. The mixture is stirred for one hour, diluted with ether, washed with saturated aqueous ammonium chloride solution and water, dried, evaporated, and the residue is chromatographed on 245 g. silica gel from benzene containing 20 percent ethyl acetate. The first fractions yield unchanged starting material; further eluates yield the title compound (VIII, R$^2$=CH$_3$, n=4) as an oil, $$\nu_{max.}^{film} \; 3475, \; 1730, \; 1710 \; cm.^{-1}$$

N.M.R. (CDCl$_3$) 3.67δ (4H, O-methyl, carbinolic), 0.91δ (3H, terminal —CH$_3$). Continued elution yields a mixture of the compounds of Formulae IX and X (R$^2$=CH$_3$, R$^3$=H, n=4), the separation of which is described below.

EXAMPLE 8

Tetrahydropyranyl ethers of 9β-hydroxy-15-oxoprostanoic acid methyl ester and 9-oxo-15ξ-hydroxyprostanoic acid methyl ester The mixture of the compounds of Formulae IX and X (R$^2$=CH$_3$, R$^3$=H, n=4) obtained as described in Example 7 (1.05 g.) is stirred overnight at room temperature with redistilled dihydropyran (1.2 g.) in chloroform (18 ml.) and p-toluenesulfonic acid (0.3 g.). Neutral alumina (activity III, 3.0 g.) is added, the mixture is stirred for another 20 minutes, filtered, the solvent evaporated, and the residue chromatographed on silica gel (260 g.) from benzene containing 10 percent ethyl acetate. Elution yields first the tetrahydropyranyl ether of 9β-hydroxy - 15 - oxoprostanoic acid methyl ester (IX, R$^2$=CH$_3$, R$^3$=tetrahydropyranyl, n=4) as an oil with $$\nu_{max.}^{film} \; 1737, \; 1710 \; cm.^{-1}$$

N.M.R. (COCl$_3$) 4.65δ (1H, doubly carbinolic), 3.82δ (1H, carbinolic, 3.67δ (3H, O-methyl) 0.91δ (terminal —CH$_3$), and continued elution then yields the tetrahydropyranyl ether of 9-oxo-15ξ-hydroxyprostanoic acid methyl ester (X, R$^2$=CH$_3$, R$^3$=tetrahydropyranyl, n=4) as an oil $$\nu_{max.}^{film} \; 1737 \; cm.^{-1}$$

N.M.R. (CDCl$_3$) 4.63δ (1H, doubly carbinolic), 3.67δ (4H, O-methyl and carbinolic), 0.89δ (3H, terminal —CH$_3$).

EXAMPLE 9

9β-hydroxy-15-oxoprostanoic acid methyl ester and 9-oxo-15ξ-hydroxyprostanoic acid methyl ester The tetrahydropyranyl ether of 9β-hydroxy-15-oxoprostanoic acid methyl ester (0.146 g.), obtained as described in Example 8 is dissolved in methanol (5 ml.) and sulfonic acid ion exchange resin ("Dowex 50–X4," 1 g.) is added. The mixture is stirred at room temperature overnight, filtered, the resin washed with hot methanol, the combined filtrate and washing evaporated, and the residue taken up in ether. The ether solution is washed with water, dried and the solvent is evaporated to yield 9β-hydroxy-15-oxoprostanoic acid methyl ester (IX, R$^2$=CH$_3$, R$^3$=H, n=4) as an oil, with $$\nu_{max.}^{film} \; 3425, \; 1730, \; 1710 \; cm.^{-1}$$

NMR (CDCl$_3$) 4.15δ (1H, carbinolic), 3.68δ (3H, O-methyl), 0.89δ (3H, terminal —CH$_3$).

In the same manner, when treating the tetrahydropyranyl ether of 9-oxo-15ξ-hydroxyprostanoic acid methyl ester (1.2 g.), obtained as described in Example 8, with "Dowex 50–X4" and proceeding as above, there is obtained 9-oxo-15ξ-hydroxyprostanoic acid methyl ester (X, R$^2$=CH$_3$, R$^3$=H, n=4) as an oil with $$\nu_{max.}^{film} \; 3425, \; 1730 \; cm.^{-1}$$

NMR (CDCl$_3$) 3.89δ (LH, carbinolic), 3.68δ (3H, O-methyl) 0.88δ (3H, terminal —CH$_3$).

EXAMPLE 10

9α-hydroxy-15-oxoprostanoic acid methyl ester (298 mg.), obtained as described in Example 7, is dissolved in methanol (4.5 ml.) and 10% aqueous sodium hydroxide (0.9 ml.) is added. The mixture is stirred at room temperature overnight, the solvent evaporated, the residue taken up in water, acidified, and extracted with ether. The ether extracts are washed, dried, and evaporated, to yield 9α-hydroxy-15-oxoprostanoic acid (VIII, R$^2$=H, n=4) as an oil with $$\nu_{max.}^{film} \; 3440, \; 1735\text{–}1700 \; cm.^{-1}$$

In the same manner, when using as starting materials the methyl esters of 9β-hydroxy-15-oxoprostanoic acid or of 9-oxo-15ξ-hydroxyprostanoic acid, both of them obtained as described in Example 9, and proceeding as above, there are obtained 9β-hydroxy-15-oxoprostanoic acid (IX, $R^2=R^3=H$, $n=4$) as an oil with $$\nu_{max.}^{film} \ 3440, \ 1730-1700 \ cm.^{-1}$$

and, 9-oxo-15ξ-hydroxyprostanoic acid (X, $R^2=R^3=H$, $n=4$) as an oil with $$\nu_{max.}^{film} \ 3420, \ 1735, \ 1710 \ cm.^{-1}$$

What is claimed is:
1. A compound of the formula

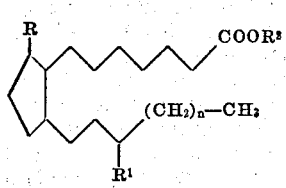

wherein R is H(OH); $R^1$ is O (ketonic oxygen); $R^2$ is hydrogen or lower alkyl from 1 to 3 carbon atoms; and $n$ represents an integer of from 1 to 6.

2. 9α-hydroxy-15-oxoprostanoic acid.
3. 9β-hydroxy-15-oxoprostanoic acid.
4. 9α-hydroxy-15-oxoprostanoic acid methyl ester.
5. 9β-hydroxy-15-oxoprostanoic acid methyl ester.

References Cited
UNITED STATES PATENTS
3,435,053  9/1969  Beal III et al. _____ 260—345.2

FOREIGN PATENTS
6611478  2/1970  Netherlands _____ 260—468

OTHER REFERENCES
Beerthuis et al.: Rec. Trav. Chim. 87, 461 (1968).

LORRAINE A. WEINBERGER, Primary Examiner
R. GERSTL, Assistant Examiner

U.S. Cl. X.R.
424—240 R, 345.7, 345.8, 463, 468 G, 473 C, 488 R, 514 D, 514 B, 520; 424—305, 317